(12) United States Patent
Berne et al.

(10) Patent No.: US 11,904,663 B2
(45) Date of Patent: Feb. 20, 2024

(54) VEHICLE WITH AN EXTERNAL SUN VISOR AND A SENSOR UNIT CONNECTED THERETO

(71) Applicant: Volvo Truck Corporation, Gothenburg (SE)

(72) Inventors: Nicolas Berne, Heyrieux (FR); Chris-Olivier Sagnard, Lyons (FR); Björn Wallin, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 588 days.

(21) Appl. No.: 17/059,548

(22) PCT Filed: Jun. 6, 2018

(86) PCT No.: PCT/EP2018/064860
§ 371 (c)(1),
(2) Date: Nov. 30, 2020

(87) PCT Pub. No.: WO2019/233575
PCT Pub. Date: Dec. 12, 2019

(65) Prior Publication Data
US 2021/0206240 A1    Jul. 8, 2021

(51) Int. Cl.
*B60J 3/02*    (2006.01)
*B60R 11/04*    (2006.01)
(Continued)

(52) U.S. Cl.
CPC ............... *B60J 3/002* (2013.01); *B60R 11/04* (2013.01); *B60R 2011/004* (2013.01)

(58) Field of Classification Search
CPC . B60J 3/002; B60R 1/00; B60R 11/04; B60R 2011/004; B60R 2011/0042;
(Continued)

(56) References Cited

U.S. PATENT DOCUMENTS

2012/0315027 A1    12/2012    Schütz
2019/0003895 A1*    1/2019    Krishnan ................ B60R 11/04

FOREIGN PATENT DOCUMENTS

CN    103209847 A    7/2013
CN    205706097 U    11/2016
(Continued)

OTHER PUBLICATIONS

International Search Report and Written Opinion for PCT/EP2018/064860, dated Feb. 27, 2019, 8 pages.
(Continued)

*Primary Examiner* — Dennis H Pedder
(74) *Attorney, Agent, or Firm* — Withrow & Terranova, PLLC

(57) ABSTRACT

The invention relates to a vehicle (1), in particular an industrial vehicle, comprising: —a cab (5), —a sun visor (6) connected thereto, and —at least one sensor unit (7a, 7b, 7c), wherein the sensor unit (7a, 7b, 7c) comprises a protecting element (9) that is pivotally and/or slidably connected to the sun visor (6) and a sensing element (8) connected to the protecting element (9), and wherein the protecting element (9) is movable between a first position, in which the sensing element (8) is positioned inside a housing (10) of the sun visor (6) and is hidden by the protecting element (9), and a second position, in which the sensing element (8) is positioned outside of the said housing (10).

9 Claims, 6 Drawing Sheets

(51) Int. Cl.
  *B60J 3/00* (2006.01)
  *B60R 11/00* (2006.01)
(58) Field of Classification Search
  CPC ....... B60R 2011/008; B60R 2011/0084; B60R 2011/0085; B60R 2011/0092; B60R 2300/802
  USPC .............................. 296/95.1, 97.5, 99.1, 152
  See application file for complete search history.

(56) References Cited

FOREIGN PATENT DOCUMENTS

| | | |
|---|---|---|
| CN | 206426813 U | 8/2017 |
| CN | 206826372 U | 1/2018 |
| DE | 102011009462 A1 | 7/2012 |
| EP | 0666196 A1 | 8/1995 |
| EP | 1550580 A1 | 12/2004 |
| FR | 2776596 A1 * 10/1999 ............... B60R 1/00 |

OTHER PUBLICATIONS

First Office Action for Chinese Patent Application No. 201880092773.3, dated Aug. 28, 2023, 18 pages.

* cited by examiner

VEHICLE WITH AN EXTERNAL SUN VISOR AND A SENSOR UNIT CONNECTED THERETO

This application is a 35 USC 371 national phase filing of International Application No. PCT/EP2018/064860, filed Jun. 6, 2018, the disclosure of which is incorporated herein by reference in its entirety.

TECHNICAL FIELD

The invention relates to a vehicle, in particular an industrial vehicle, equipped with at least one sensor unit.

This invention can be applied to several industrial vehicles, such as trucks, buses and construction equipment.

BACKGROUND

Many industrial vehicles, in particular trucks, currently employ cameras or other similar sensors to provide driving assistance to drivers. In general, such sensors are scattered across the cab roof, each sensor having its own interface in the cab. Such a configuration leads to a complex and non-aesthetic cab structure with several protruding bumps. Furthermore, each sensor's interface creates a hole in the cab that increases the risk of water intrusion. Finally, when a sensor must be replaced, it is often difficult to access to the sensors from the inside of the cab.

Prior art document EP 1 550 580 A1 discloses a vehicle equipped with an external viewing unit, in particular a television camera unit, in which the viewing unit is supported by a sun shield. However, this document does not provide a suitable solution to the aesthetic issue considering that the viewing units are merely connected externally to a conventional sun shield.

Therefore, there is a need for a vehicle equipped with at least one sensor unit, avoiding the above-mentioned problems. The aim of the present invention is thus to provide a solution to these problems.

SUMMARY

The invention concerns a vehicle, in particular an industrial vehicle, comprising:
a cab,
a sun visor connected thereto, and
at least one sensor unit,
wherein the sensor unit comprises a protecting element that is pivotally and/or slidably connected to the sun visor and a sensing element connected to the protecting element, and wherein the protecting element is movable between a first position, in which the sensing element is positioned inside a housing of the sun visor and is hidden by the protecting element, and a second position, in which the sensing element is positioned outside of the said housing.

Thus configured, the vehicle of the present invention allows having a perfect integration of the sensing element in the sun visor, the sensing element being hidden inside the sun visor when not in use.

The vehicle may also include one or more of the following features, taken alone or in combination.

According to one embodiment, the protecting element is flush with an external surface of the sun visor in its first position.

Thus configured, the vehicle of the present invention may have the same aesthetic aspect as a conventional vehicle when the sensing element is not in use.

According to a further embodiment, the sensing element is chosen among a camera, a radar, a lidar and an antenna.

According to a further embodiment, the sensing element is a camera, the camera being oriented in the second position of the protecting element to capture images in a specific surrounding area.

Thus configured, the vehicle of the present invention allows disposing the camera in a specific orientation relative to the sun visor such that it can catch the proper field of vision when in use.

According to a further embodiment, the housing is positioned in a central part of the sun visor such that the camera can capture images in a surrounding area in front of the vehicle when the protecting element is in its second position.

According to a further embodiment, the housing is positioned at one lateral end of the sun visor such that the camera can capture images in a surrounding area behind the cab and/or on one side thereof when the protecting element is its second position.

According to a further embodiment, the vehicle comprises at least three cameras, respectively a central camera and two lateral cameras, the central camera being intended to capture images in a surrounding area in front of the vehicle and the lateral cameras being intended to capture images in a surrounding area behind the cab and/or on both sides thereof.

According to a further embodiment, the central camera is adapted to provide at least a class VI field of vision as defined in the Regulation UN ECE no°46.

According to a further embodiment, the lateral cameras are adapted to provide at least a class II and/or IV and/or V field of vision as defined in the Regulation UN ECE no°46.

According to a further embodiment, the vehicle comprises a control unit adapted to control the sensing element, said control unit being entirely housed inside the sun visor.

According to a further embodiment, the vehicle comprises wires electrically connecting the sensing element to the control unit, said wires being entirely housed inside the sun visor.

According to a further embodiment, the vehicle comprises a washer unit adapted to clean the sensing element, said washer unit being entirely housed inside the sun visor.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1A:
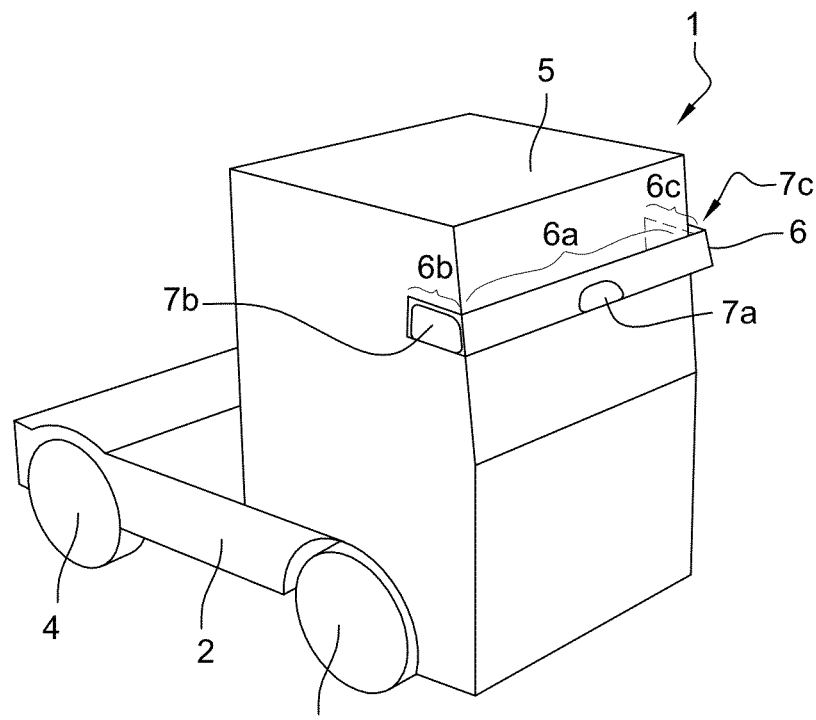
FIGS. 1A and 1B are schematic perspective views of an industrial vehicle according to a first embodiment of the invention, respectively in a parking mode and in a driving mode.

FIG. 1A shows an industrial vehicle 1, more specifically a truck. Although the invention will be described with respect to a truck, the invention is not restricted to this particular vehicle, but may be used in other vehicles, such as a bus.

The vehicle 1 comprises a frame 2 supported by front wheels 3 and rear wheels 4 as well as a cab 5 at its front side. In the following paragraphs, the term "front" or "frontward" means "toward the front side of the vehicle" and the term "rear" or "rearward" means "toward the rear side of the vehicle". The terms "left side" and "right side" refer to the lateral sides of the vehicle relative to a driver seated in the cab. The term "lateral direction" or "laterally" refers to a "left-to-right direction" and the term "longitudinal direction" or "longitudinally" refers to a "rear-to-front direction".

Figure 2A:
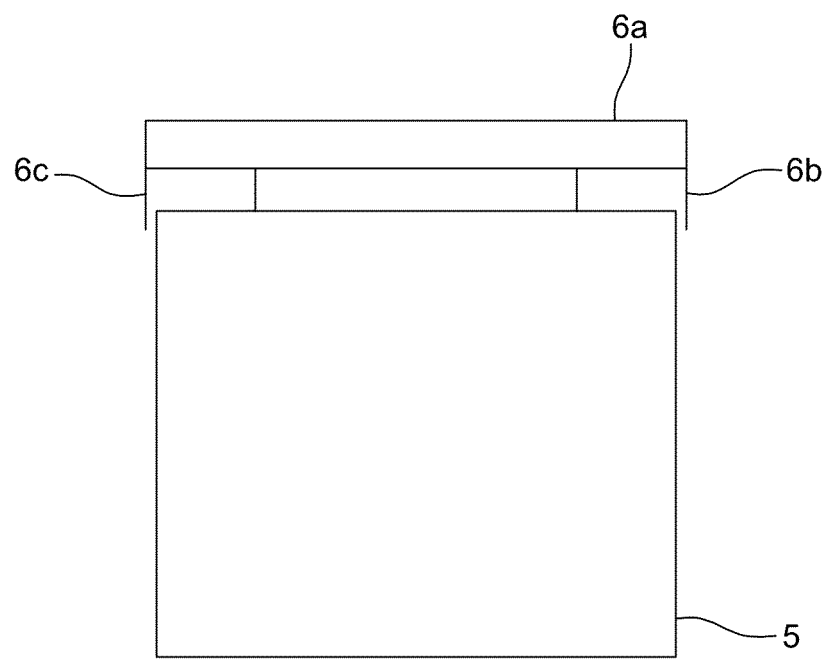
FIGS. 2A and 2B are schematic top views of the cab of the industrial vehicle illustrated in FIGS. 1A and 1B.
Figure 3A:
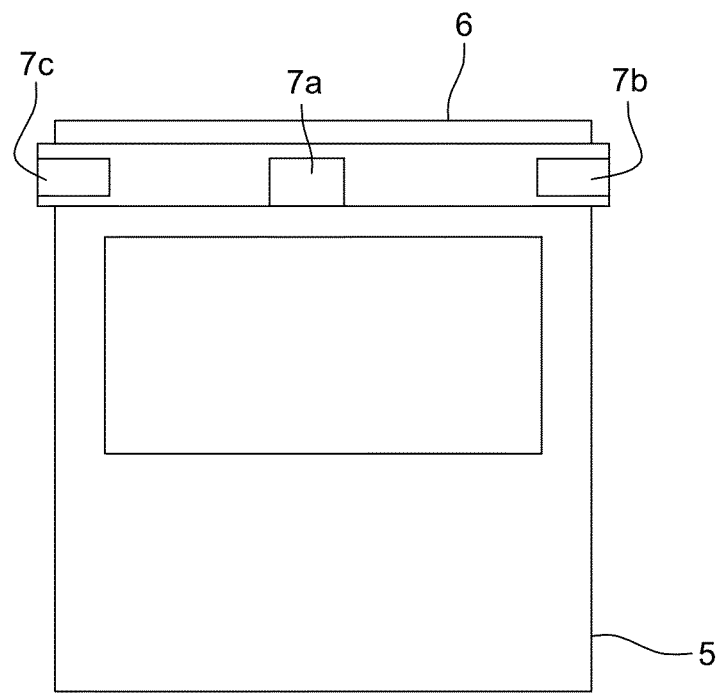
FIGS. 3A and 3B are schematic front views of the cab of the industrial vehicle illustrated in FIGS. 1A and 1B.

The vehicle 1 is also equipped with a sun visor 6 that is fixedly connected to the cab 5. As illustrated, the sun visor 6 is positioned in front of the cab 5 and in the top part thereof. The sun visor 6 comprises a central section 6a extending across the full width of the cab 5 and two lateral sections 6b, 6c extending perpendicular to said central section 6a and at both sides thereof. In addition to the conventional function of protecting the driver from the sun's rays, the sun visor 6 is also adapted to support sensor units 7a, 7b and 7c, respectively a central sensor unit 7a supported by the central section 6a and two lateral sensor units 7b, 7c supported by the lateral sections 6b, 6c respectively. In the position shown in FIG. 1A, corresponding to the parking mode of the vehicle 1, the sensor units 7a-7c are substantially hidden inside the sun visor 6 such that one can consider the sun visor 6 as a conventional sun visor. Such a position is also illustrated in FIGS. 2A and 3A.

Figure 1B:
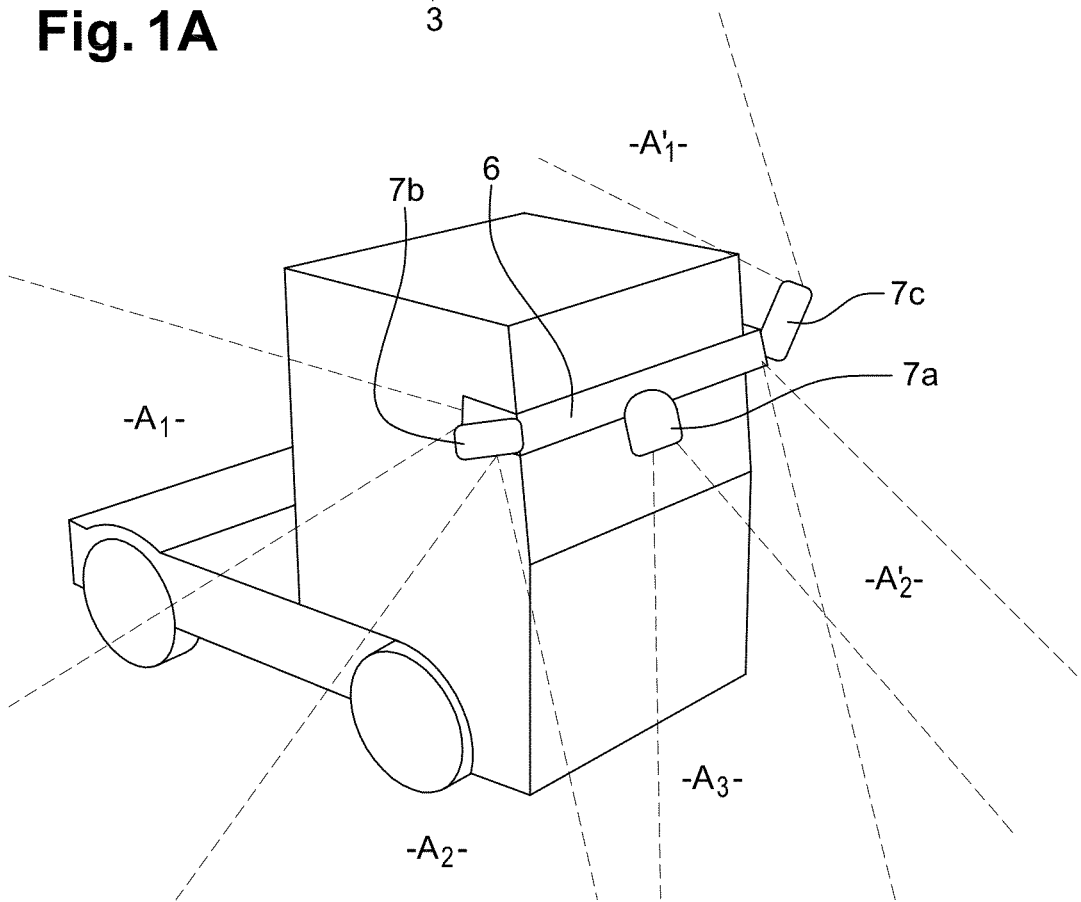
Figure 2B:
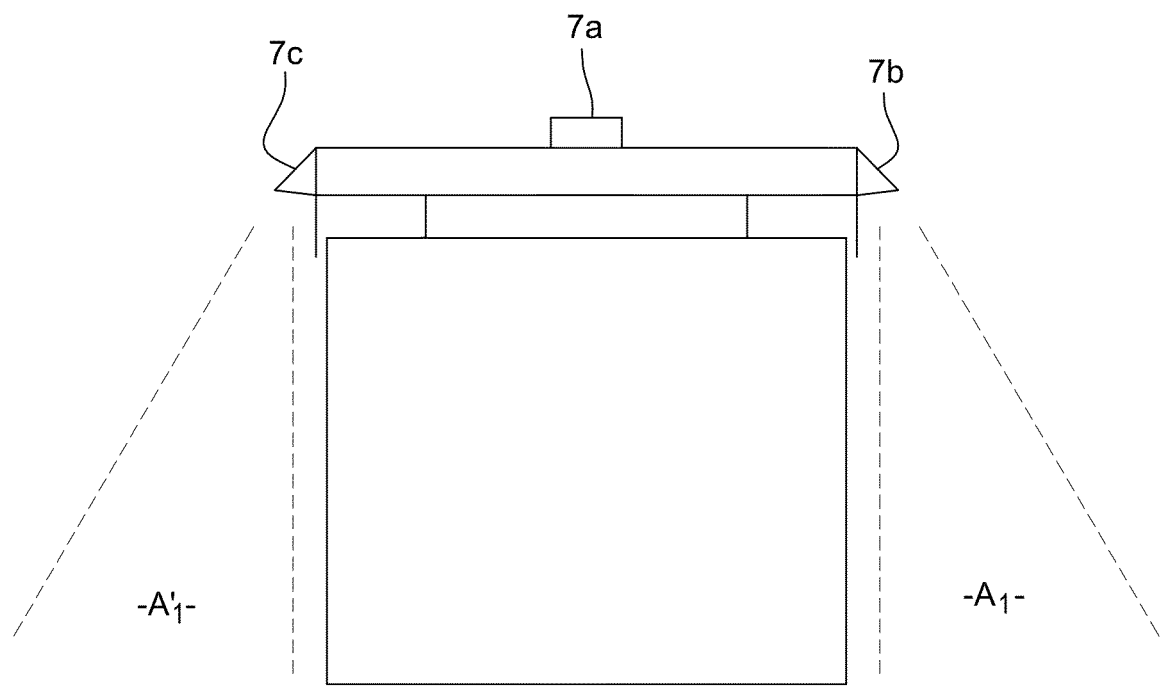
Figure 3B:
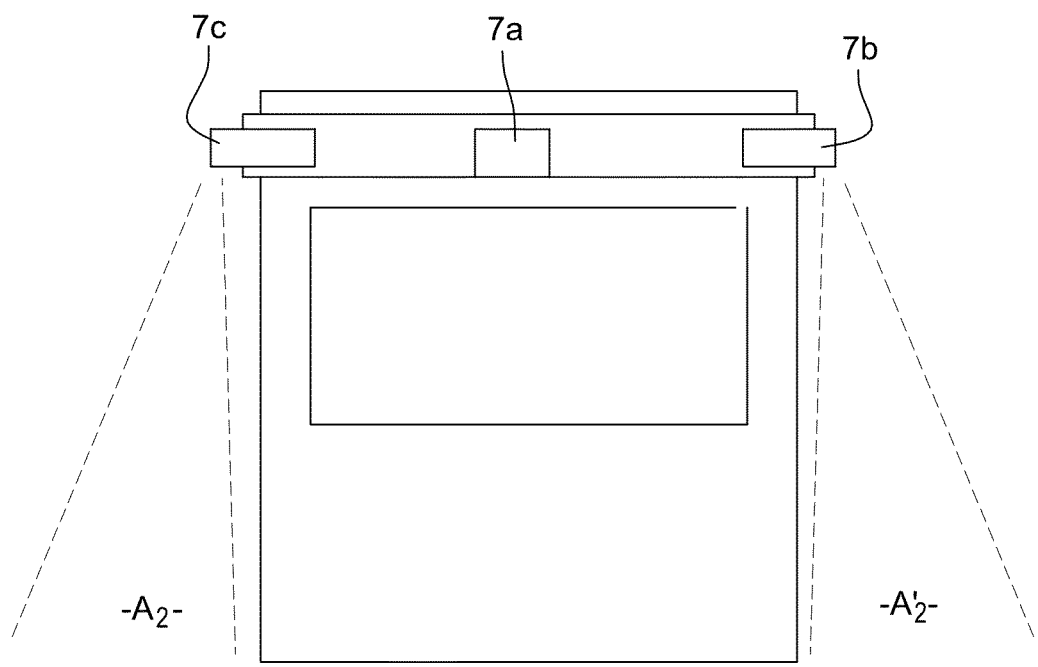

In the position shown in FIGS. 1B, 2B and 3B, corresponding to the driving mode of the vehicle 1, the orientation of the sensor units 7a-7c relative to the sun visor 6 may be modified so that the central sensor unit 7a is shifted forward and the lateral sensor units 7b, 7c are shifted on the sides. In these shifted orientations, the sensor units 7a-7c are correctly positioned to cover specific sensing areas A1, A1', A2, A2' and A3 around the cab 5. In particular, the sensor units 7b and 7c may advantageously cover conical areas on both sides of the cab 5, the axes of the conical areas being oriented rearward, as in sensing areas A1 and A1', or toward the ground, as in sensing areas A2 and A2'. The sensor unit 7a may advantageously cover a conical area A3 in front of the cab 5, the axis of the conical area A3 being oriented toward the ground.

Figure 4:
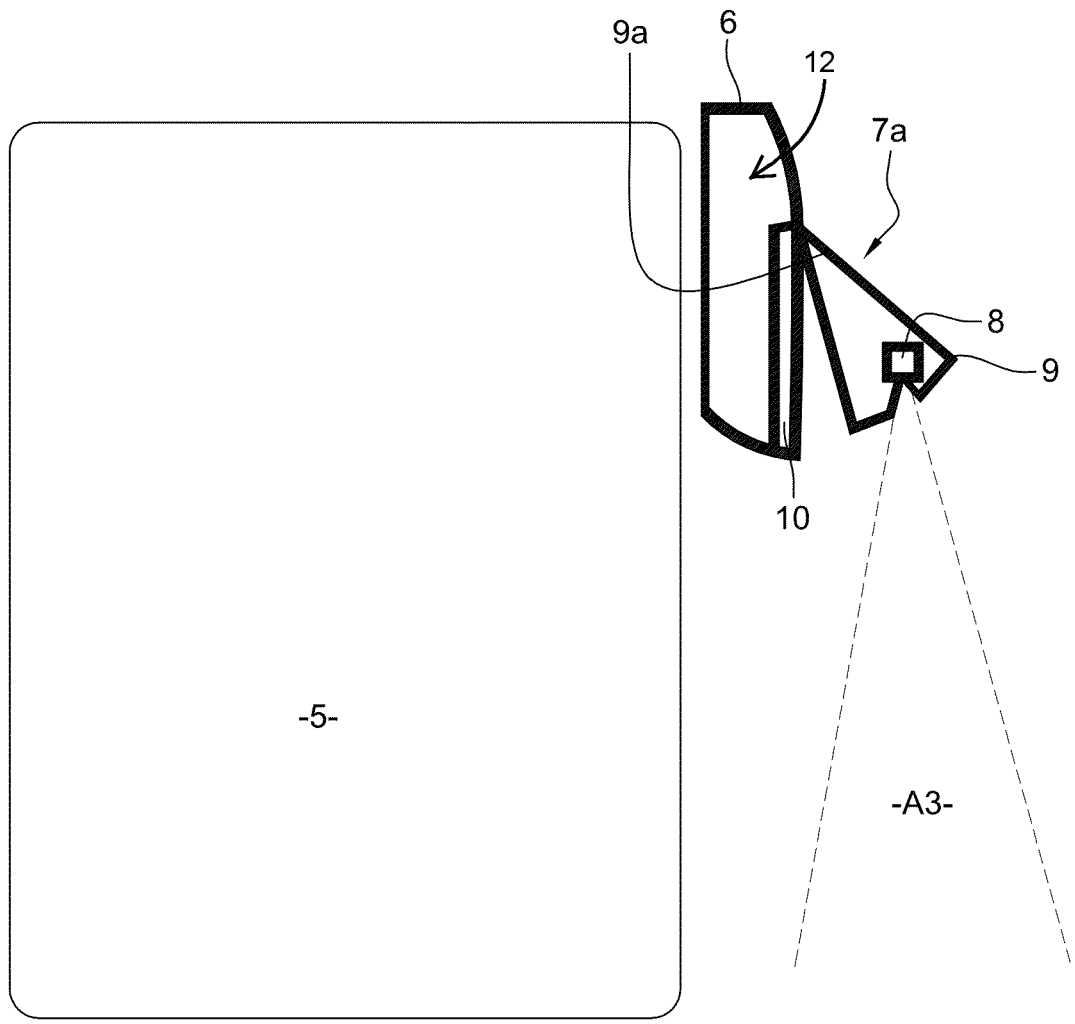
FIG. 4 is a schematic cross-sectional side view of the cab of the industrial vehicle illustrated in FIG. 1B.
Figure 5A:
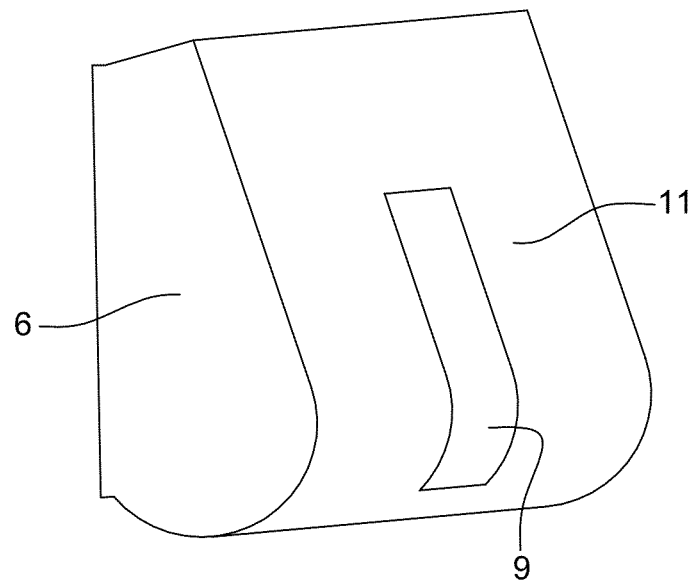
FIGS. 5A and 5B are schematic perspective views of a portion of the sun visor equipping the industrial vehicle illustrated in FIGS. 1A and 1B.
Figure 5B:
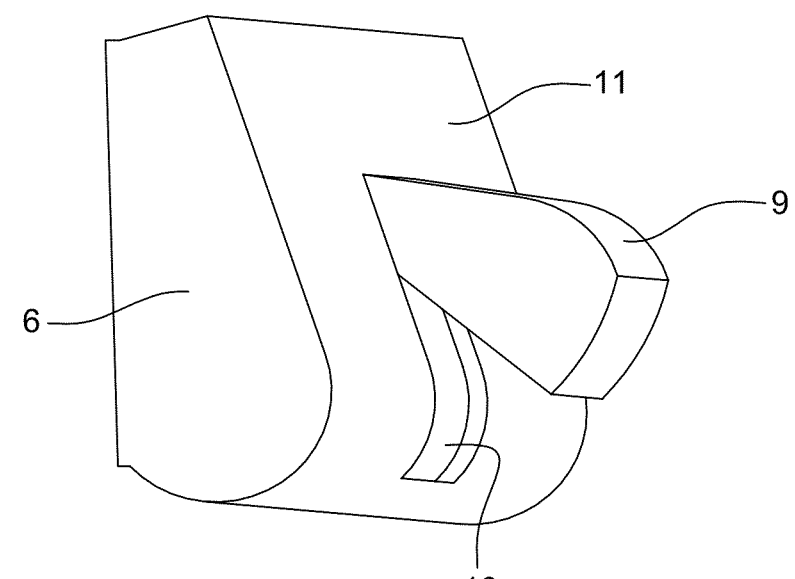

In reference to FIG. 4, it is illustrated an advantageous configuration for the sensor unit 7a. Similar configuration may advantageously be used for the sensor units 7b, 7c. In this specific configuration, the sensor unit 7a comprises a sensing element 8 that is housed inside a protecting element 9 and connected thereto. The protecting element 9 is pivotally connected to the sun visor 6 at its upper end 9a and is movable through actuating means (not illustrated) between a first position, as illustrated in FIG. 5A, in which the protecting element 9, and thus the sensing element 8, is positioned inside a housing 10 of the sun visor 6, and a second position, as illustrated in FIG. 5B, in which the protecting element 9, and thus the sensing element 8, is positioned outside of the housing 10. In the first position, the protecting element 9 is advantageously flush with an external surface 11 of the sun visor 6, thus preserving the aesthetics of the sun visor 6. Furthermore, in this position, corresponding to the parking mode of the vehicle 1, the sensing element 8 is hidden by the protecting element 9 and protected against corrosion damage, due to the weather for instance, or against vandalism. The movement of the protecting element 9 from the first position to the second position may advantageously be controlled by a control unit 12 to accurately dispose the sensing element 8 in an adequate orientation relative to the sun visor 6 so as to cover the specific sensing area A3 in the driving mode of the vehicle 1. The same control unit or an other control unit may advantageously be used to control the sensing element 8, in particular when the protecting element 9 is in its second position. This control unit may advantageously be housed inside the sun visor 6 so as to protect it against vandalism or corrosion damage. Same applies to the wires that electrically connects the sensing element 8 to the control unit or to a washer unit that may be used to clean the sensing element 8.

The sensing element 8 may advantageously be chosen among a camera, a radar, a lidar and an antenna. Other sensing elements may however be used.

In the specific embodiment illustrated in FIGS. 1A and 1B, the sensing element 8 of each sensor unit 7a-7c is a camera. The vehicle 1 thus comprises at least three cameras, respectively a central camera and two lateral cameras, the central camera being intended to capture images in the surrounding area A3 in front of the vehicle 1 and the lateral cameras being intended to capture images in the surrounding areas A1, A1' behind the cab and/or in the surrounding areas A2, A2' on both sides thereof. The central camera may advantageously be configured to provide a class VI field of vision as defined in the Regulation UN ECE no. 46 and the lateral cameras may advantageously be configured to provide a class II or IV field of vision as defined in the Regulation UN ECE no. 46. The sun visor 6 may also include lighting means to support the camera vision and signaling means in replacement and/or in addition to conventional signaling means supported by the cab 5. The cameras may also be used for other purposes, such as automation, environmental perception, or object detection.

Figure 6A:
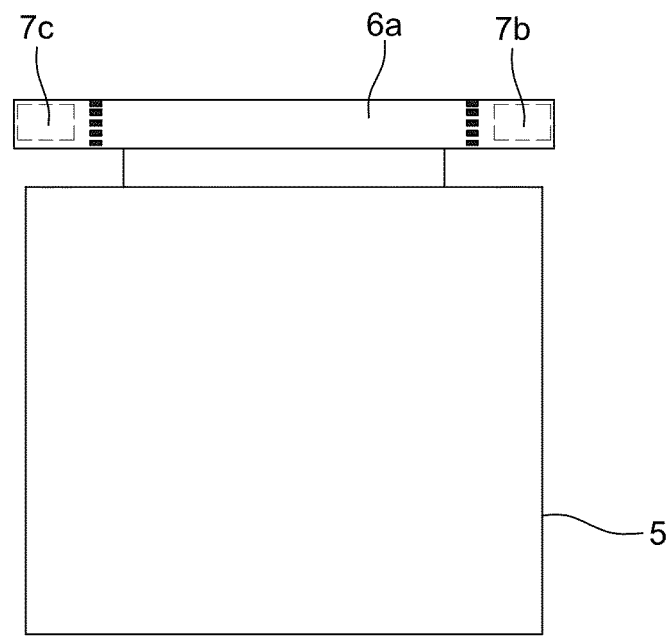
FIGS. 6A and 6B are schematic perspective views of an industrial vehicle according to a second embodiment of the invention, respectively in a parking mode and in a driving mode.
Figure 6B:
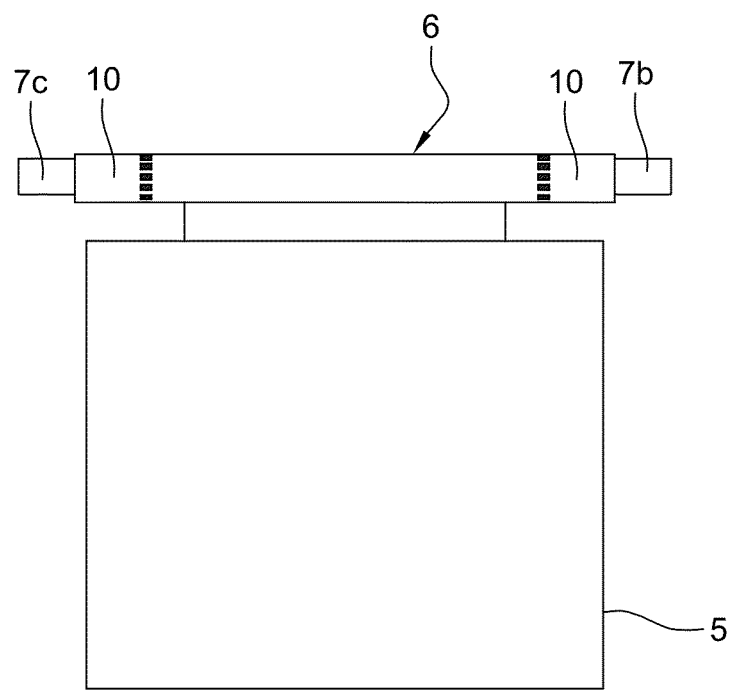

In reference to FIGS. 6A and 6B, it is illustrated an alternative embodiment of the vehicle of the invention. In this embodiment, the vehicle 1 is also equipped with a sun visor 6 that is fixedly connected to the cab 5. But, as illustrated, the sun visor 6 comprises only a straight section 6a extending across the full width of the cab 5 and does not comprise lateral sections. The sun visor 6 supports two lateral sensor units 7b, 7c. In the parking mode of the vehicle 1, as shown in FIG. 6A, each sensor unit 7b, 7c is substantially hidden inside a housing 10 of the sun visor 6 such that one can consider the sun visor 6 as a conventional sun visor. In the position shown in FIG. 6B, corresponding to the driving mode of the vehicle 1, the lateral sensor units 7b, 7c have been shifted on the sides of the sunvisor 6, thus positioning them outside the housings 10. In particular, the sensor units 7b, 7c may advantageously be slidably connected to the sun visor 6 via a rail (not illustrated) supported by the sun visor 6, such that the sensor units 7b, 7c substantially translates along a lateral direction during the transfer from the position illustrated in FIG. 6A to the position illustrated in FIG. 6B. The rail may also rotate along a vertical axis, such that the orientation of the rails, and thus of the sensor units 7b, 7c, relative to the sun visor 6 may vary. The rotation of the rails may advantageously be synchronized with the translation of the sensor units 7b, 7c along the rails to reach the desired parking position into the housing 10.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising:
a cab;
a sun visor connected to the cab; and
at least one sensor unit,
wherein the sensor unit comprises a protecting element that is pivotally connected to the sun visor and a sensing element connected to the protecting element, and
wherein the protecting element is movable between a first position, in which the sensing element is positioned inside a housing of the sun visor and is hidden by the protecting element, and a second position, in which the sensing element is positioned outside of the housing;
wherein the protecting element is flush with an external surface of the sun visor in the first position.

2. The vehicle of claim 1, wherein the sensing element comprises at least one of a camera, a radar, a lidar and an antenna.

3. The vehicle of claim 2, wherein the sensing element comprises a camera, the camera being oriented in the second position of the protecting element to capture images in a specific surrounding area.

4. The vehicle of claim 3, wherein the housing is positioned in a central part of the sun visor such that the camera can capture images in a surrounding area in front of the vehicle when the protecting element is in the second position.

5. The vehicle of claim 3, wherein the housing is positioned at one lateral end of the sun visor such that the camera can capture images in a surrounding area of at least one of behind the cab and on one side of the cab when the protecting element is in the second position.

6. The vehicle of claim 3, comprising at least three cameras including a central camera and two lateral cameras, the central camera configured to capture images in a surrounding area in front of the vehicle and the lateral cameras configured to capture images in a surrounding area of at least one of behind the cab and on both sides of the cab.

7. The vehicle of claim 6, wherein the central camera is adapted to provide at least a class VI field of vision as defined in the Regulation UN ECE n° 46.

8. The vehicle of claim 6, wherein the lateral cameras are configured to provide at least one of a class II, IV, and V field of vision as defined in the Regulation UN ECE n° 46.

9. The vehicle of claim 1, further comprising a control unit configured to control the sensing element, the control unit being entirely housed inside the sun visor.

* * * * *